(12) United States Patent
Jones (10) Patent No.: US 7,205,530 B2
(45) Date of Patent: Apr. 17, 2007

(54) ENCODER DEVICE AND APPARATUS FOR GAPPING AND CENTERING AN ENCODER DEVICE

(75) Inventor: Jonathan Jones, Santa Barbara, CA (US)

(73) Assignee: Renco Encoders, Inc., Goleta, CA (US)

( * ) Notice: Subject to any disclaimer, the term of this patent is extended or adjusted under 35 U.S.C. 154(b) by 0 days.

(21) Appl. No.: 11/130,624

(22) Filed: May 16, 2005

(65) Prior Publication Data

US 2006/0255251 A1   Nov. 16, 2006

(51) Int. Cl.
*G01D 5/34* (2006.01)
(52) U.S. Cl. .................. 250/231.13; 250/239
(58) Field of Classification Search ........... 250/231.13, 250/231.14, 231.16, 231.18, 239; 341/11, 341/13
See application file for complete search history.

(56) References Cited

U.S. PATENT DOCUMENTS

| | | | |
|---|---|---|---|
| 4,512,184 A | 4/1985 | Ernst et al. | |
| 4,794,250 A | 12/1988 | Togami | |
| 4,942,295 A | 7/1990 | Brunner et al. | |
| 5,057,684 A | 10/1991 | Service | |
| 5,708,496 A | 1/1998 | Barnett et al. | |
| 6,452,160 B1 | 9/2002 | Mitterreiter | |
| 6,462,442 B1 * | 10/2002 | Braun et al. | 310/68 B |
| 6,714,292 B2 | 3/2004 | Mitterreiter | |

FOREIGN PATENT DOCUMENTS

EP            0 557 564        9/1993

* cited by examiner

*Primary Examiner*—Kevin Pyo
(74) *Attorney, Agent, or Firm*—Kenyon & Kenyon LLP (57) ABSTRACT

An encoder device includes: a housing; a hub arranged in the housing, the hub arranged to carry an encoder disk, the hub rotatable in the housing; and a gapping and centering device carried by the housing and including a slide that is movable between a first position and a second position. The slide in the first position is arranged to urge the hub into a predetermined axial and radial position relative to a portion of the housing, and the slide in the second position is arranged to permit axial and radial movement of the hub. The slide is arranged on an axial side of the housing opposite to an axial side on which the housing is to be mounted to a device to be measured, and the slide in the first position and in the second position does not extend beyond a radial periphery of the housing.

17 Claims, 11 Drawing Sheets

ENCODER DEVICE AND APPARATUS FOR GAPPING AND CENTERING AN ENCODER DEVICE

FIELD OF THE INVENTION

The present invention relates to an encoder device and to an apparatus for gapping and centering an encoder device.

BACKGROUND INFORMATION

Encoders are used to measure angular or linear motion. A common use of encoders is for computer numeric control (CNC) machines. In one type of encoder, e.g., a rotary encoder, an encoder disk is rotatable with a shaft of, e.g., a motor, relative to detector electronics that are mounted in a housing of the encoder. In such rotary encoders, it is generally necessary to radially align the encoder disk relative to the shaft so that the rotation axis of the shaft is coaxial to the center of the encoder disk to thereby radially align the rotation axis of the encoder disk relative to the detector electronics. It may also be necessary to gap the encoder disk relative to the detector electronics. That is, it may be necessary to axially align the encoder disk relative to the detector electronics.

Examples of gapping and centering devices are described, for example, in U.S. Pat. Nos. 5,057,684, 5,708,496, 6,714, 292, European Published Patent Application No. 0 557 564, U.S. Pat. Nos. 6,452,160, 4,794,250, 4,942,295 and 4,512, 184, each of which is expressly incorporated herein in its entirety by reference thereto.

In some situations, it may be desirable or a necessity to mount an encoder in a tubular or other confined space that is not significantly larger than the encoder itself. For example, servo-motors may be made using a continuous extrusion for the frame, thereby requiring the encoder to be mounted in a pocket having an inner diameter that is approximately equal to an outer diameter of motor windings. Certain of the gapping and centering devices described in U.S. Pat. Nos. 5,057,684, 5,708,496, 6,714,292, European Published Patent Application No. 0 557 564, U.S. Pat. Nos. 6,452,160, 4,794,250, 4,942,295 and 4,512,184 include a slide that is bottom mounted or centrally mounted in the encoder. Such devices may be difficult or T impossible to manipulate when installed in a close fitting pocket. Furthermore, the slides of these devices generally must extend beyond the periphery of the encoder, thereby rendering them difficult or impossible to operate when installed in, e.g., a close fitting pocket.

Figure 1:
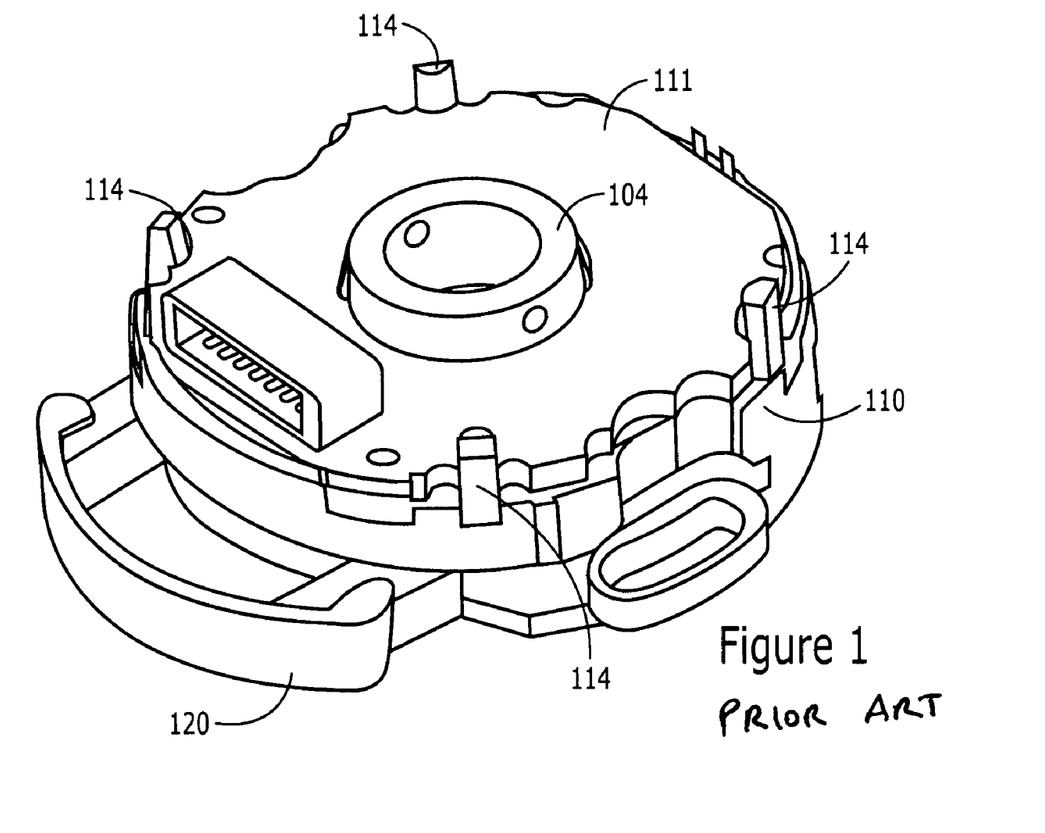
FIG. 1 is a perspective view of a conventional encoder.

A conventional encoder, e.g., an encoder having a bottom mounted slide, is illustrated in FIG. 1. As illustrated in FIG. 1, a gapping slide 120 extends beyond housing 110 of the encoder when the gapping slide 120 is in the engaged position, e.g., engaging hub 104. FIG. 1 also illustrates that an encoder may include a printed circuit board (PCB) 111 and clip posts 114 that mount the PCB 111 on the housing 110.

SUMMARY

It is an aspect of an example embodiment of the present invention to provide that a slide of a gapping and centering device for an encoder is top mounted so that the slide may be readily manipulated in a variety of mounting configurations.

It is an aspect of an example embodiment of the present invention to provide that a slide of a gapping and centering device for an encoder does not extend beyond the periphery of the encoder in the engaged position of the slide.

According to an example embodiment of the present invention, an encoder device includes: a housing; a hub arranged in the housing, the hub arranged to carry an encoder disk the hub rotatable in the housing; and a gapping and centering device carried by the housing and including a slide that is movable between a first position and a second position. The slide in the first position is arranged to urge the hub into a predetermined axial and radial position relative to a portion of the housing, and the slide in the second position is arranged to permit axial and radial movement of the hub. The slide is arranged on an axial side of the housing opposite to an axial side on which the housing is to be mounted to a device to be measured, and the slide in the first position and in the second position does not extend beyond a radial periphery of the housing.

The housing may include a substantially circular periphery.

The slide may include two parallel clamping arms connected by a transverse bridge member.

The gapping and centering device may include two clamping jaws arranged on diametrically opposite sides of the hub, and a distal end of each clamping arm may include a protrusion adapted to urge the clamping jaws against the hub in the first position of the slide.

The hub may include a circumferential groove, and each clamping jaw may include a protrusion arranged to be received in the groove to urge the hub into the predetermined axial and radial position in the first position of the slide.

The protrusions of the clamping jaws and the groove of the hub may include complementary profiles.

The encoder device may include a cover coupleable to the housing.

The cover may be coupleable to the housing in at least two axial positions relative to the housing.

The encoder device may include detection electronics arranged in the housing and adapted to detect at least one of (a) an absolute angular position of the encoder disk and (b) a relative rotational movement of the encoder disk.

According to an example embodiment of the present invention, a gapping and centering device for an encoder device includes: a carrier element connectable to a housing of the encoder; and a slide that is movable between a first position and a second position. The slide in the first position is arranged to urge a hub of the encoder into a predetermined axial and radial position relative to a portion of the housing, and the slide in the second position is arranged to permit axial and radial movement of the hub. The slide is arranged on an axial side of the carrier element opposite to an axial side on which the carrier element is connectable to the housing, and the slide in the first position and in the second position does not extend beyond a radial periphery of the carrier element.

The carrier element may have a substantially circular periphery.

The slide may include two parallel clamping arms connected by a transverse bridge member.

The carrier element may include two diametrically opposed clamping jaws arranged to engage the hub, and a distal end of each clamping arm may include a protrusion adapted to urge the clamping jaws against the hub in the first position of the slide.

Each clamping jaw may include a protrusion arranged to be received in a groove of the hub to urge the hub into the predetermined axial and radial position in the first position of the slide.

The protrusions of the clamping jaws may have a profile complementary to a profile of the groove.

The gapping and centering device may include a cover coupleable to one of (a) the carrier element and (b) the housing of the encoder.

The cover may be coupleable to the one of (a) the carrier element and (b) the housing in at least two axial positions relative thereto.

DETAILED DESCRIPTION

As indicated above, FIG. 1 is a perspective view of a conventional encoder, which includes a housing 110, a printed circuit board (PCB) 111, a hub 104, and a gapping slide 120. PCB 111 may be held in position on encoder housing 110 by clip posts 114. The clip posts 114 may be integrated into the encoder housing 110, which may be composed of, e.g., a polymer or other electrically non-conductive material. PCB 111 may be composed of pure or doped silicon and may include circuitry of appropriate material or manufacture, either on the surface(s) of PCB 111 and/or internal to PCB 111.

FIGS. 2 to 11 illustrate example embodiments of the present invention. The hub 4 of an encoder is a rotating element made of, for example, metal, which may be configured to accommodate a shaft element, such as, for example, the shaft of a motor. The encoder may be a rotary encoder adapted to measure absolute and/or relative rotation of the motor shaft. A clamping arrangement in the form of two clamping jaws is provided to temporarily immobilize the hub 4 relative to the housing 10 so that the encoder disk carried by the hub 4 may be gapped and/or centering. The clamping jaws are operated by a slide 51, which is movable between an engaged position, in which the clamping jaws frictionally engage the hub 4, thereby preventing rotation of the hub 4, and a disengaged position, in which the clamping jaws are not engaged with the hub 4, thereby permitting the hub 4 to rotate.

In the engaged position, the slide 120 illustrated in FIG. 1 extends beyond the outer diameter or periphery of the encoder. Furthermore, the slide 120 illustrated in FIG. 1 is bottom mounted. Accordingly, the slide 120 may be difficult or impossible to manipulate if the encoder is mounted, e.g., in a tubular space that is not significantly larger than the encoder itself.

Figure 2:
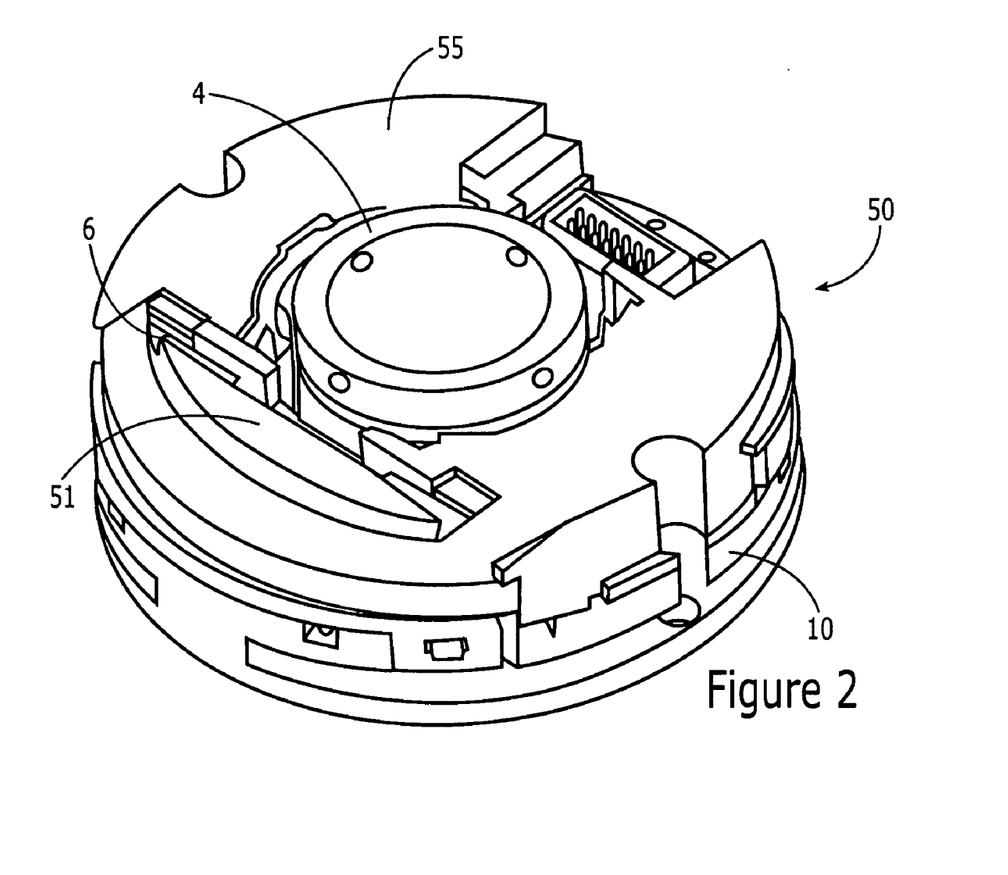
FIG. 2 is a perspective view of an encoder according to an exemplary embodiment of the present invention illustrating a gapping and centering device in a disengaged position.

FIG. 2 is a perspective view of an encoder according to an example embodiment of the present invention. The encoder includes a housing 10 and gapping and centering apparatus 50. The gapping and centering apparatus 50 provides virtually zero overhang relative to the encoder housing 10, which allows the encoder to be mounted in, e.g., a tubular space that is not significantly larger than the encoder itself. This may be an advantage because certain servo-motors are made using a continuous extrusion for the frame, thereby requiring the encoder to be mounted in a pocket that is approximately the same diameter as the motor windings.

Figure 9:
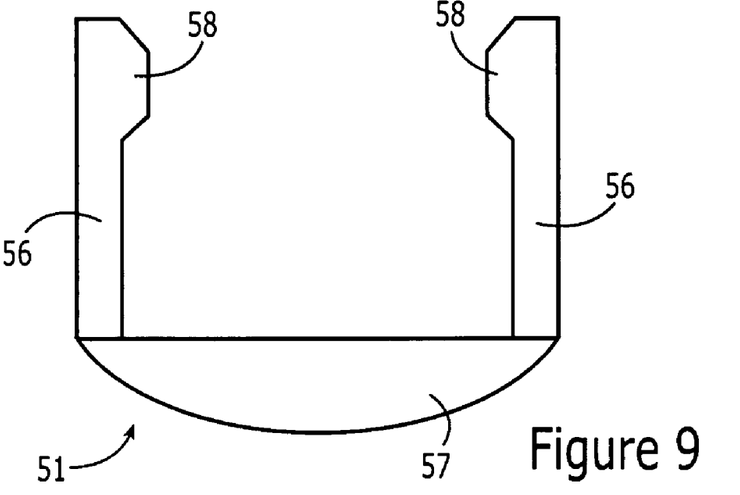
FIG. 9 is a top plan view of a slide of the gapping and centering device.
Figure 9A:
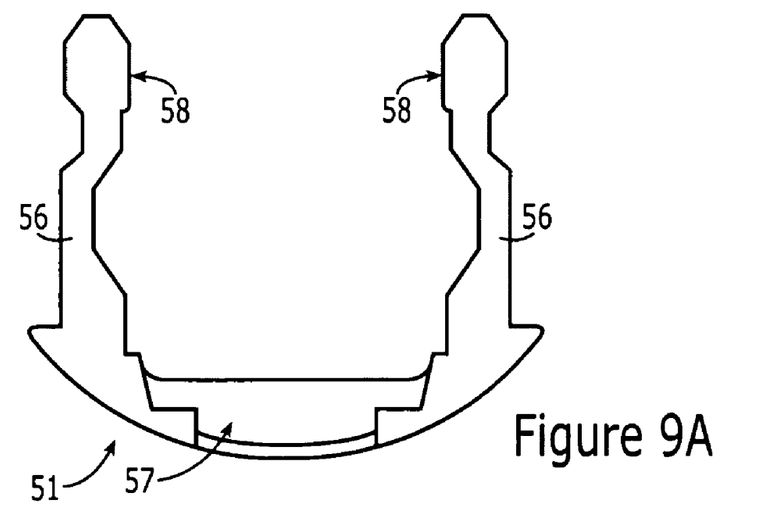
FIG. 9A is a top plan view of a slide of the gapping and centering device.

The gapping and centering apparatus 50 includes a carrier element, e.g., cap 55, and a slide 51 arranged on a top surface of the cap 55, and, consequently, the encoder, rather than on an underside of the encoder, cf., FIG. 1, which may make the slide 51 easier to access in comparison with the slide 120 illustrated in FIG. 1, and may also minimize interference with mounting surface features. The combination of zero overhang and top access may allow the encoder hereof to be mounted in a pilot, similar to a resolver, without interference with the gapping and centering apparatus 50. Hence, unlike conventional configurations, where the slide extends beyond the outer diameter of the encoder and on the bottom of the encoder, the gapping and centering apparatus 50 may not interfere with pilot mounting arrangements. The slide 51 includes two substantially parallel clamping arms 56 and a transverse bridge member 57. Located at the distal ends of the clamping arms 56 are protrusions 58. FIGS. 9 and 9A illustrate details of example embodiments of slide 51. In FIG. 2, the slide 51 is illustrated in a disengaged position relative to the hub 4.

Figure 3:
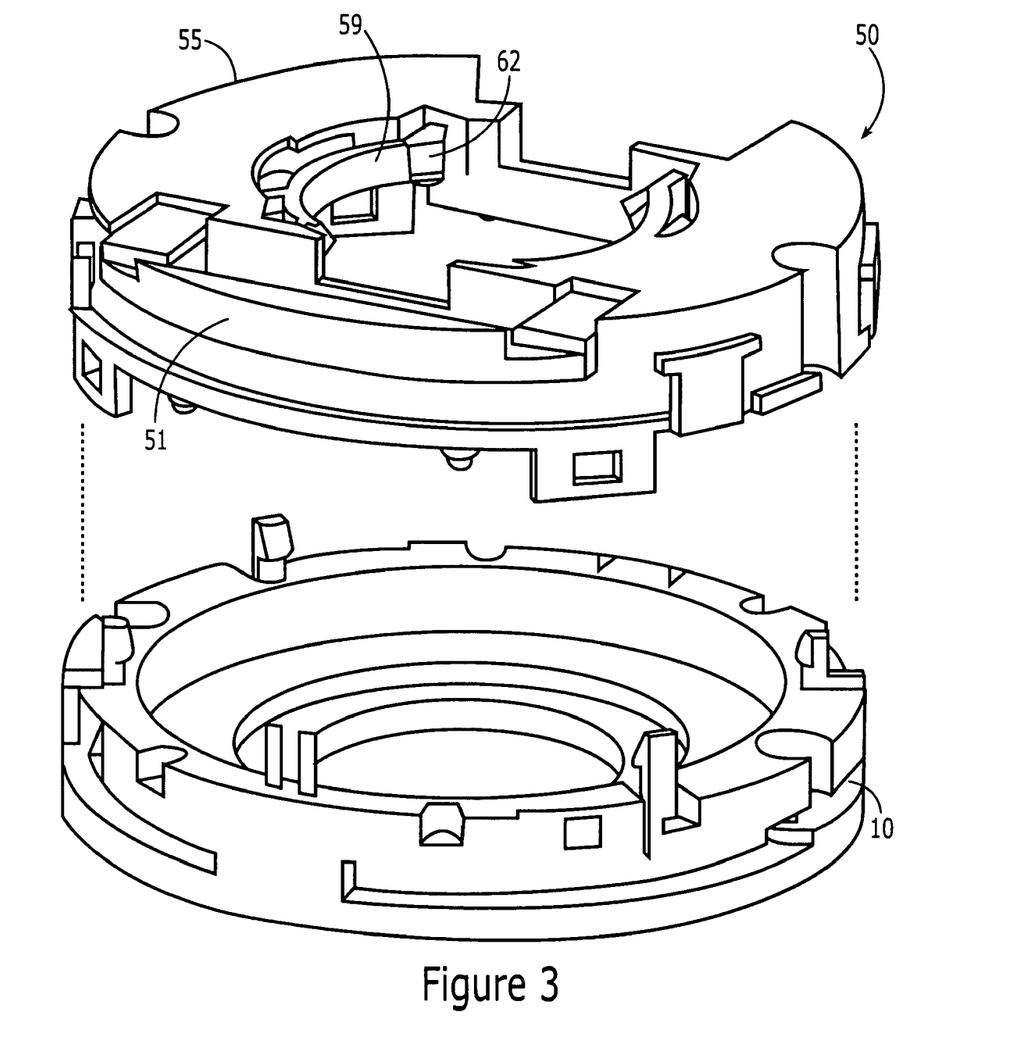
FIG. 3 is an exploded view of the encoder illustrated in FIG. 2.
Figure 10:
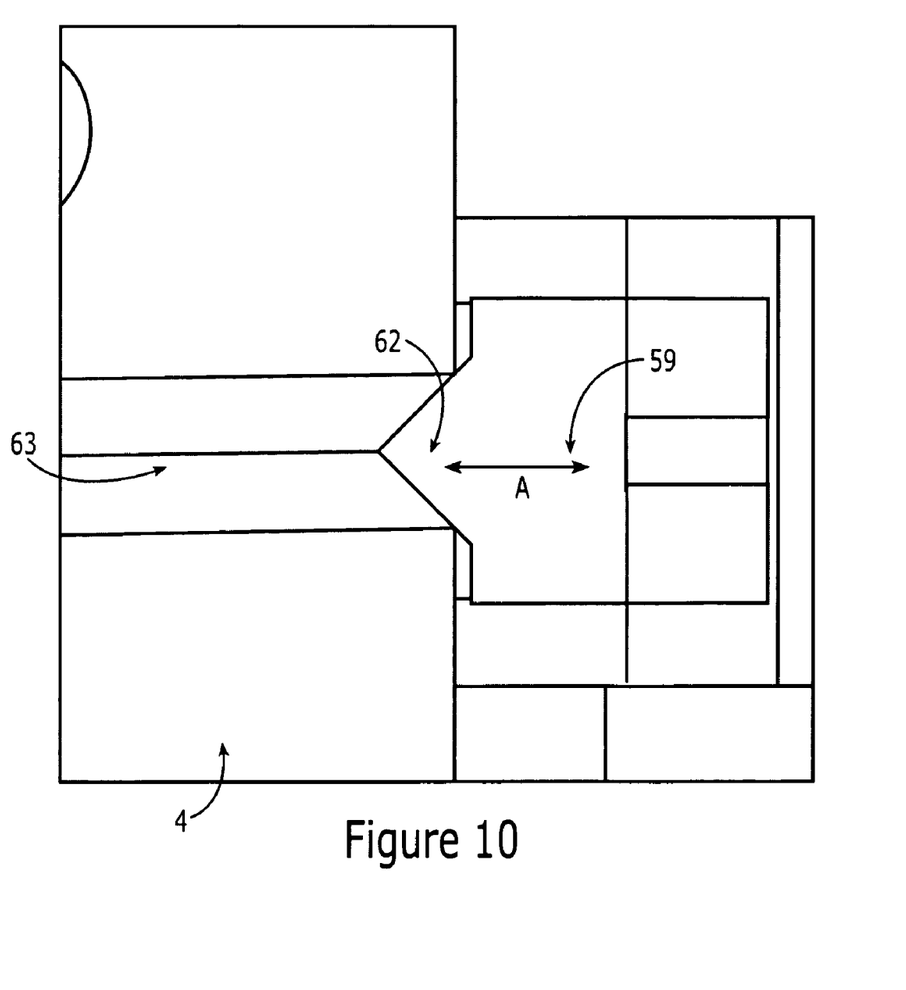
FIG. 10 is an enlarged side view of a hub of the encoder and a clamping jaw of the gapping and centering device in an engaged position.
Figure 11:
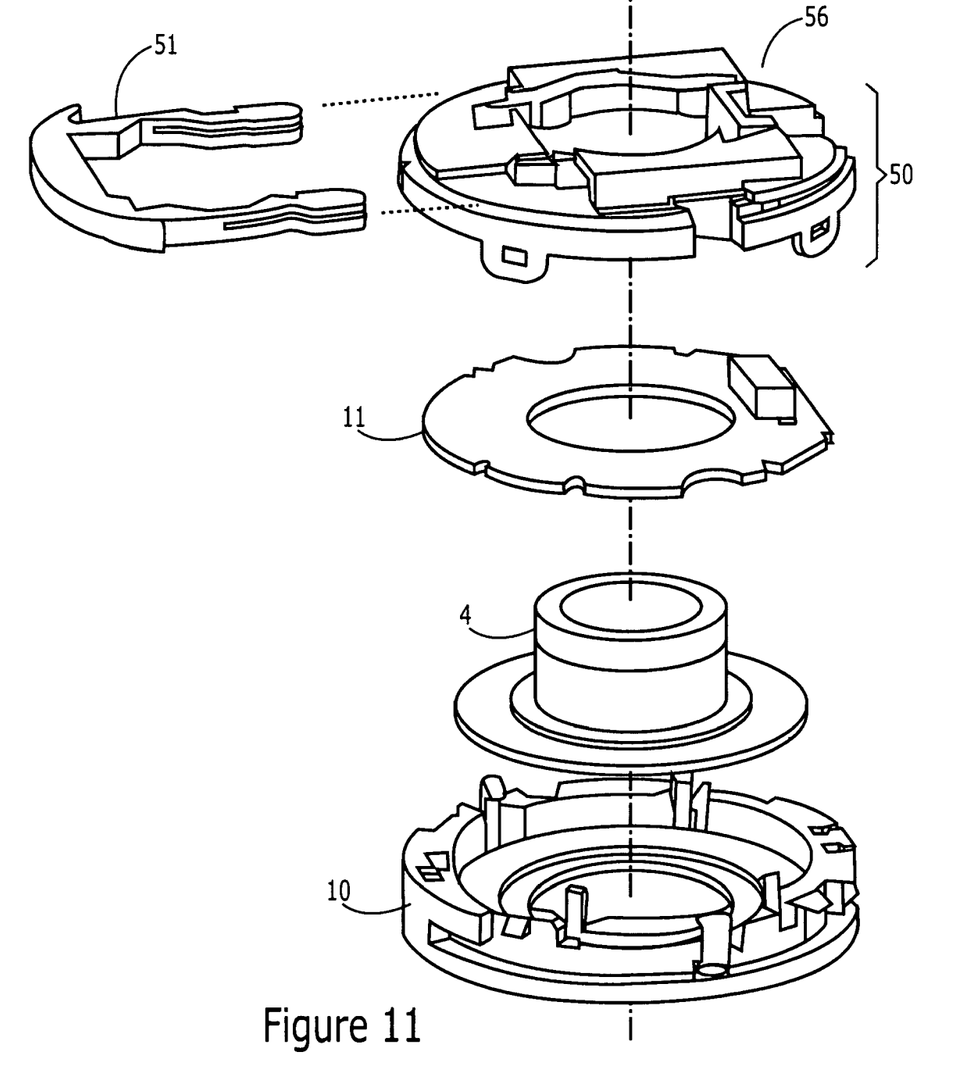
FIG. 11 is an exploded, perspective view of an encoder of an exemplary embodiment of the present invention.

FIG. 3 is an exploded view of the encoder illustrated in FIG. 2. As illustrate in FIG. 4, the cap 55 includes clamping jaws 52, each having a clamping body portion 59 resiliently supported by spring elements 61, e.g., webs. When the slide 51 is in the engaged position, each protrusion 58 is disposed adjacent the respective clamping body portion 59 and urges the respective clamping body portion 59 against the hub 4, thereby preventing rotation of the hub 4 and permitting centering and gapping the hub 4 relative to the shaft. When the slide is in the disengaged position, the protrusions 58 are translated out of alignment and engagement with the clamping body portions 59, thereby disengaging the clamping body portions 59 from engagement with the hub 4. As illustrated, for example, in FIG. 4, which is a perspective view of the encoder, and FIG. 10, the hub 4 may include a groove 63, and the clamping body portion 59 may include protrusions 62 at their terminal ends. The groove 63 and protrusions 62 may have complementary profiles so that engagement of the clamping body portions 59 with the hub 4 results in engagement of the protrusions 62 with the groove 63. This engagement of the protrusions 62 in the groove 63 urges the hub 4, and the encoder disk carried by the hub 4, into the desired axial position of the encoder disk with detector electronics of the encoder. That is, the encoder disk is urged into the desired centering, e.g., radial, position and into the desired gapping, e.g., axial, position. In FIG. 10, arrow A indicates the engagement and disengagement direction of the clamping body portion 59 and protrusions 62 relative to hub 4.

Figure 4:
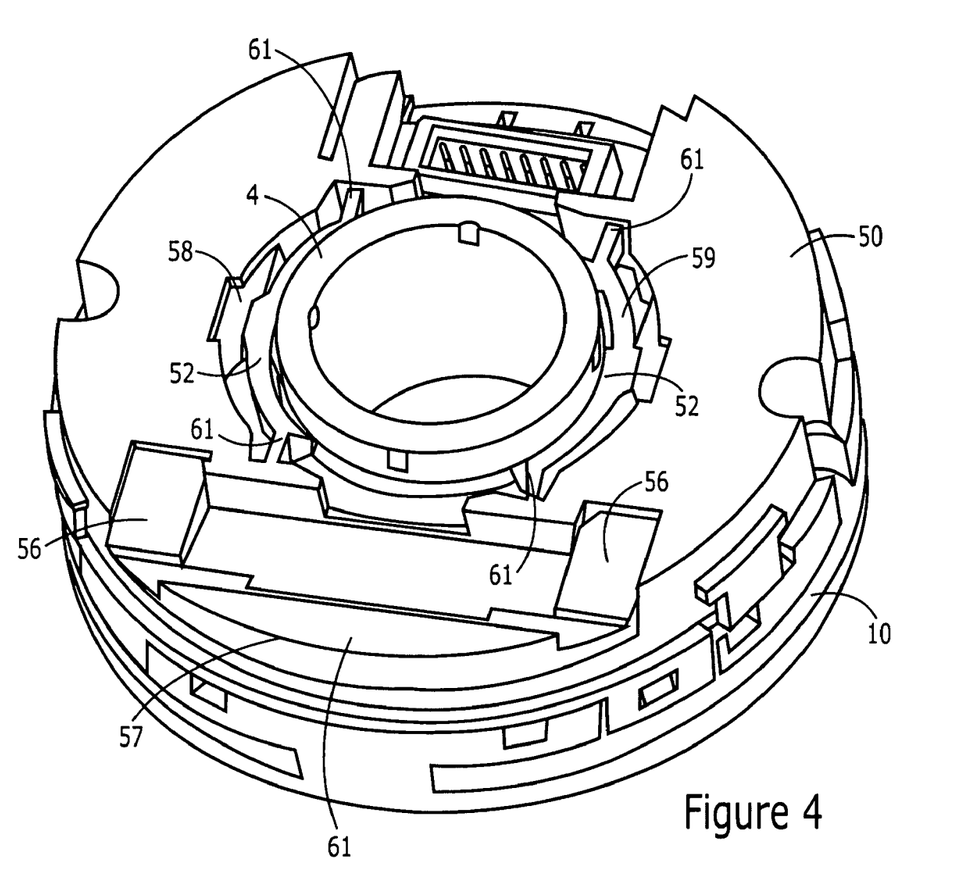
FIG. 4 is a perspective view of the encoder illustrated in FIG. 2 illustrating the gapping and centering device in an engaged position.

In FIG. 4, the slide 51 of the gapping and centering apparatus 50 is located in the engaged position, in which the hub 4 is immobilized by frictional engagement of two clamping jaws 52 with the hub 4. As illustrated in FIG. 4, in the engaged position, the slide 51 does not extend beyond the outside diameter of the encoder.

Figure 5:
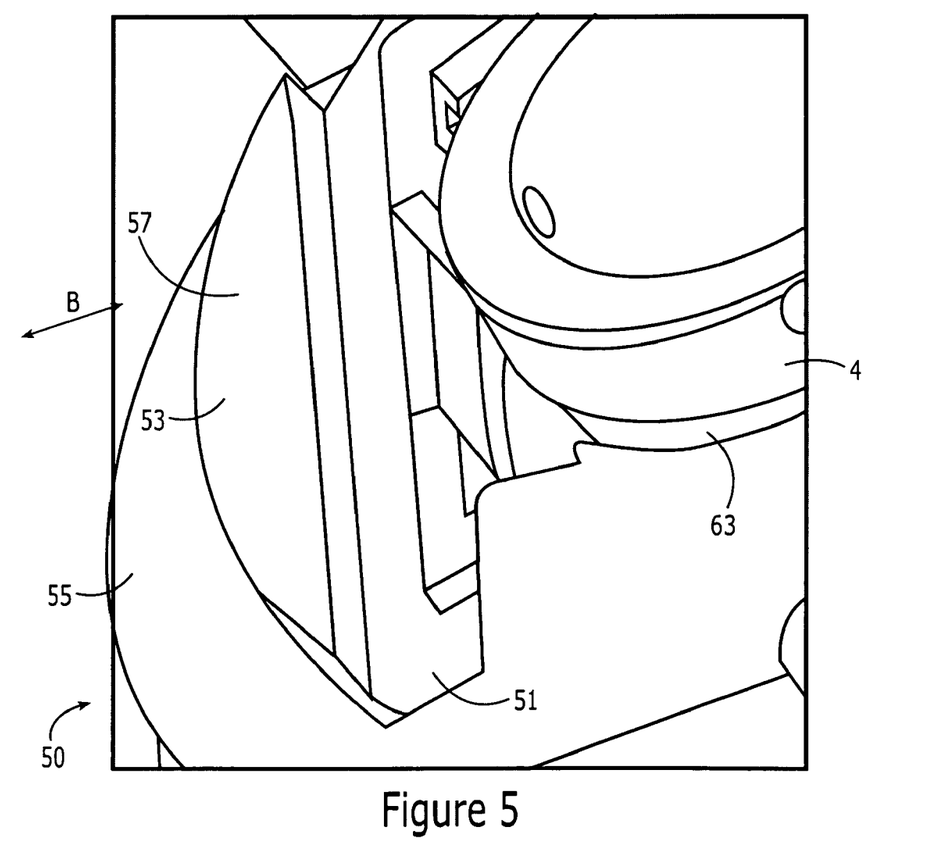
FIG. 5 is an enlarged perspective view of the encoder illustrated in FIG. 2.

FIG. 5 is an enlarged perspective view of the encoder. Slide 51 is illustrated in the disengaged position. As illustrated in FIG. 5, the slide 51 may be readily moved between the engaged position and the disengaged position by exerting, e.g., tool or finger, pressure against the tab 53 of slide 51 in the direction of arrow B.

Figure 6A:
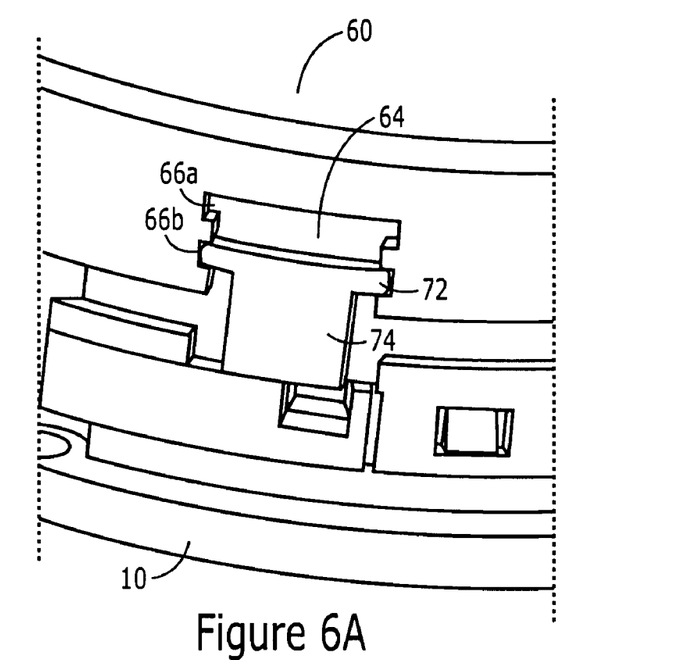
FIGS. 6A and 6B are partial perspective views of a cover-mounting mechanism of an encoder of an exemplary embodiment of the present invention.
Figure 6B:
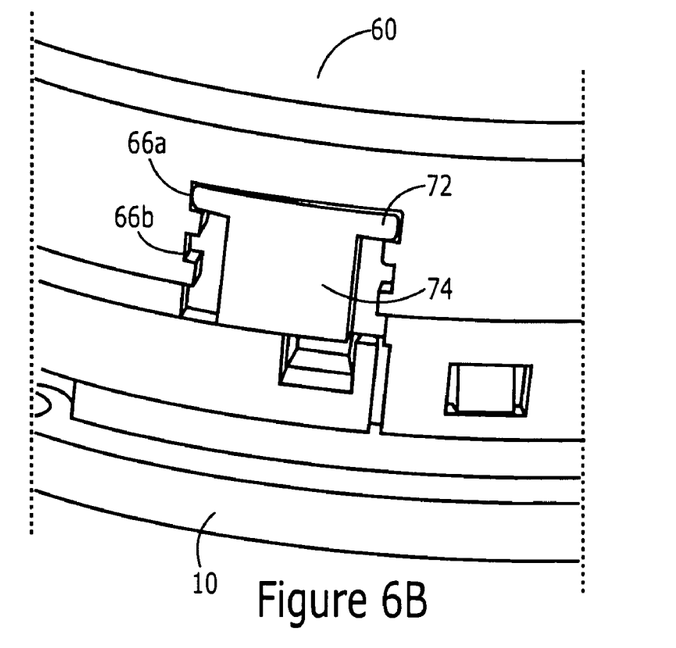

FIGS. 6A and 6B are side views of a cover-mounting mechanism of the encoder and illustrate that a cover 60 may be mounted on the encoder housing 10 at different heights depending on, e.g., customer requirements, clearance requirements, etc. As illustrated in FIGS. 6A and 6B, the housing 10 or the cap 55 includes a tab 74 having two arms 72. The cover 60 includes recess 64 positioned to receive the tab 74 therein. The recess 64 includes a first pair of detents 66a and a second pair of detents 66b arranged to receive the arms 72 to thereby mount the cover 60 at two different heights. It should be appreciated that more than two pairs of detents 66a, 66b may be provided depending on the desired number of mounting heights. The cover 60 may include multiple recesses 64 spaced around its circumference, and/or multiple tabs 74 may be spaced around the circumference of the housing 10 or cap 55.

Figure 7:
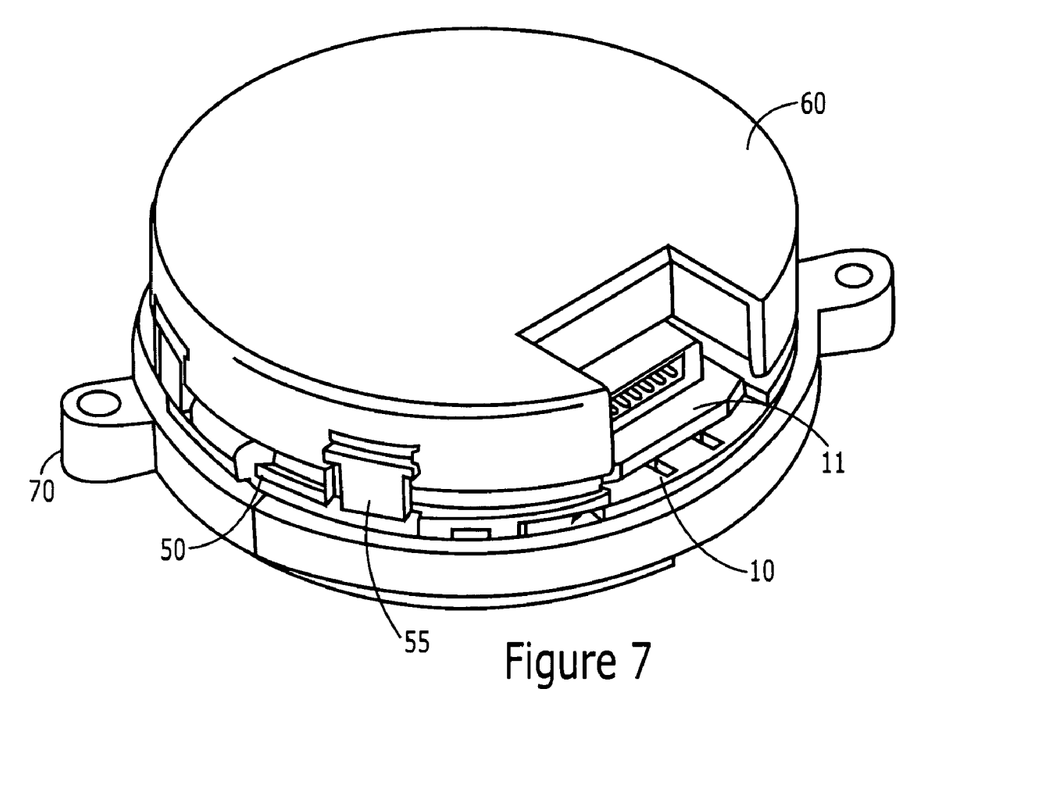
FIG. 7 is a perspective view of an encoder of an exemplary embodiment of the present invention.
Figure 8:
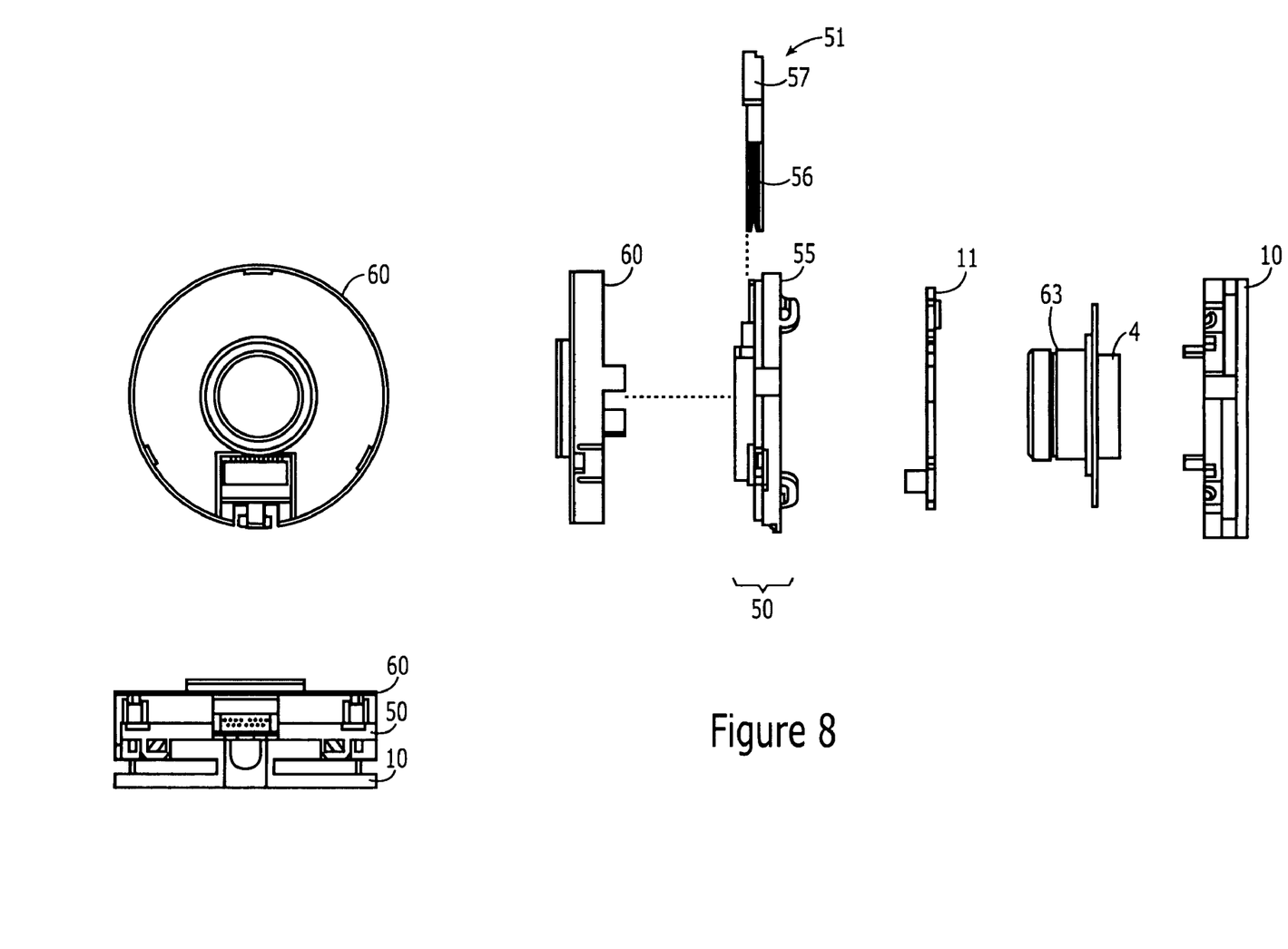
FIG. 8 is an exploded view of an encoder of an exemplary embodiment of the present invention.

FIG. 7 is another perspective view of the encoder. The gapping and centering apparatus 50 is partially or completely covered by the cover 60, and the encoder housing 10 is surrounded by a molded servo cleat 70. The cleat 70 is formed by two self-complementary coupleable semicircular parts. Since the slide 51 is mounted on the top surface of the cap 55, operation of the slide 51 is not impeded by the presence of the cleat 70. In contrast, gapping and centering mechanisms of certain conventional encoders having bottom- or side-mounted slides may not be operable with such a cleat 70 due to interference between the cleat 70 and the slide.

What is claimed is:

1. An encoder device, comprising:
   a housing;
   a hub arranged in the housing, the hub arranged to carry an encoder disk, the hub rotatable in the housing; and
   a gapping and centering device carried by the housing and including a slide that is movable between a first position and a second position, the slide in the first position arranged to urge the hub into a predetermined axial and radial position relative to a portion of the housing, the slide in the second position arranged to permit axial and radial movement of the hub, the slide arranged on an axial side of the housing opposite to an axial side on which the housing is to be mounted to a device to be measured, the slide in the first position and in the second position not extending beyond a radial periphery of the housing.

2. The encoder device according to claim 1, wherein the housing has a substantially circular periphery.

3. The encoder device according to claim 1, wherein the slide includes two parallel clamping arms connected by a transverse bridge member.

4. The encoder device according to claim 3, wherein the gapping and centering device includes two clamping jaws arranged on diametrically opposite sides of the hub, a distal end of each clamping arm including a protrusion adapted to urge the clamping jaws against the hub in the first position of the slide.

5. The encoder device according to claim 4, wherein the hub includes a circumferential groove, each clamping jaw including a protrusion arranged to be received in the groove to urge the hub into the predetermined axial and radial position in the first position of the slide.

6. The encoder device according to claim 5, wherein the protrusions of the clamping jaws and the groove of the hub include complementary profiles.

7. The encoder device according to claim 1, further comprising a cover coupleable to the housing.

8. The encoder device according to claim 7, wherein the cover is coupleable to the housing in at least two axial positions relative to the housing.

9. The encoder device according to claim 1, further comprising detection electronics arranged in the housing and adapted to detect at least one of (a) an absolute angular position of the encoder disk and (b) a relative rotational movement of the encoder disk.

10. A gapping and centering device for an encoder device, comprising:
    a carrier element connectable to a housing of the encoder; and
    a slide that is movable between a first position and a second position, the slide in the first position arranged to urge a hub of the encoder into a predetermined axial and radial position relative to a portion of the housing, the slide in the second position arranged to permit axial and radial movement of the hub, the slide arranged on an axial side of the carrier element opposite to an axial side on which the carrier element is connectable to the housing, the slide in the first position and in the second position not extending beyond a radial periphery of the carrier element.

11. The gapping and centering device according to claim 10, wherein the carrier element has a substantially circular periphery.

12. The gapping and centering device according to claim 10, wherein the slide includes two parallel clamping arms connected by a transverse bridge member.

13. The gapping and centering device according to claim 12, wherein the carrier element includes two diametrically opposed clamping jaws arranged to engage the hub, a distal end of each clamping arm including a protrusion adapted to urge the clamping jaws against the hub in the first position of the slide.

14. The gapping and centering device according to claim 13, wherein each clamping jaw includes a protrusion arranged to be received in a groove of the hub to urge the hub into the predetermined axial and radial position in the first position of the slide.

15. The gapping and centering device according to claim 14, wherein the protrusions of the clamping jaws has a profile complementary to a profile of the groove.

16. The gapping and centering device according to claim 1, further comprising a cover coupleable to one of (a) the carrier element and (b) the housing of the encoder.

17. The gapping and centering device according to claim 16, wherein the cover is coupleable to the one of (a) the carrier element and (b) the housing in at least two axial positions relative thereto.

* * * * *